(12) United States Patent
Noll et al.

(10) Patent No.: US 6,705,436 B2
(45) Date of Patent: Mar. 16, 2004

(54) VEHICLE PARK BRAKE ACTUATOR SYSTEM

(75) Inventors: Michael L. Noll, Fort Wayne, IN (US); Tom E. Harting, Fort Wayne, IN (US); Gayle D. Goodrich, Fort Wayne, IN (US); Trevor T. Downes, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/964,949

(22) Filed: Sep. 27, 2001

(65) Prior Publication Data

US 2003/0057035 A1 Mar. 27, 2003

(51) Int. Cl.[7] ............................................... F16D 55/08
(52) U.S. Cl. ..................... 188/72.9; 188/72.1; 188/72.6; 188/2 D; 74/535; 74/501.6
(58) Field of Search .................... 188/72.9, 72.1, 188/72.3, 72.4, 72.6, 2 D, 69; 74/491, 497, 501.6, 512, 523, 528, 543, 545, 535, 557

(56) References Cited

U.S. PATENT DOCUMENTS

| | | | | |
|---|---|---|---|---|
| 4,036,078 A | * | 7/1977 | Muehling | 74/529 |
| 4,049,096 A | * | 9/1977 | Barth | 192/220.1 |
| 4,441,380 A | * | 4/1984 | Kawaguchi et al. | 74/512 |
| 4,612,823 A | * | 9/1986 | De Leeuw et al. | 74/533 |
| 5,001,942 A | * | 3/1991 | Boyer | 74/535 |
| 5,247,850 A | * | 9/1993 | Lenzke | 74/523 |
| 5,528,956 A | * | 6/1996 | Harger et al. | 74/517 |
| 5,819,595 A | * | 10/1998 | Cebollero | 74/535 |

FOREIGN PATENT DOCUMENTS

JP          3-239651 A   * 10/1991   ................ 74/529

* cited by examiner

Primary Examiner—Jack Lavinder
Assistant Examiner—Mariano Sy
(74) Attorney, Agent, or Firm—Jeffrey P. Calfa; Dennis Kelly Sullivan; Susan L. Lukasik

(57) ABSTRACT

A vehicle has a park brake system, which has set a set operational state for holding the vehicle in a parked position, and a released operational state in which the vehicle may be driven. The park brake system includes a park brake actuator and connecting linkages which are driven by an operator of the vehicle in an engaging direction in order to effect the set operational state of the park brake system. The park brake system further includes a return spring engaged to the connecting linkages in such a manner to drive them and the park brake actuator in a disengaging direction and to ensure maintenance of the released operational state of the park brake system after it is effected by an operator. The park brake system also includes an impact-reduction energy absorber such as a spring, damper, or some combination thereof for absorbing some of the energy transferred to the connecting linkages when the return spring drives the connecting linkages and the park brake actuator in their disengaging directions.

28 Claims, 9 Drawing Sheets

VEHICLE PARK BRAKE ACTUATOR SYSTEM

BACKGROUND OF THE INVENTION

This invention relates to a park brake actuator system for a vehicle. As is well known, vehicles often comprise a park brake system for preventing undesirable inadvertent motion of the vehicle when it is not in use. Park brake systems of vehicles generally comprise one or more braking components and one or more braked components complimentary to each of the one or more braked components. The braking component of each complimentary pair of a braking component and a braked component is anchored to either the superstructure of the vehicle or a drivetrain of the vehicle. The superstructure of a vehicle being the main strength providing structure of the vehicle which provides support for and ensures proper relative location of a large percentage of the other components of the vehicle. For vehicles of body-on-frame construction the superstructure of the vehicle is a frame of the vehicle and for vehicles of unibody construction the superstructure is the main body structure of the vehicle. The braked component of each complimentary pair of a braking component and a braked component is anchored to whichever of the superstructure of the vehicle and the drivetrain of the vehicle its complimentary braking component is not anchored to. More specifically, which ever of the braking component and the braked component is anchored to the drivetrain of the vehicle is anchored to a working component of the drivetrain. For purposes of this disclosure a working component of the drivetrain of the vehicle is defined to be a component that must move relative to the superstructure of the vehicle in order for the vehicle to travel along the ground. As is well known, at least one of the braking component and the braked component of a parking brake system of a vehicle generally has attached to it friction material as is well known. Parking brake systems are constructed in such a manner that the braking component of the parking brake can be selectively maintained in a released position in which it is not in contact with the braked component or driven into and maintained in a set position in which the friction material that is attached to the braking component and/or the braked component is forcibly compressed between the braking component and the braked component. When the braking component is in its released position the parking brake system presents little to no resistance to movement of the working components of the drivetrain of the vehicle relative to the superstructure of the vehicle and, therefore presents little to no resistance to travel of the vehicle. When the braking component is in its set position frictional forces between the braking component, the braked component and the friction material between them resists relative motion between the braking component and the braked component and thus relative motion is resisted between the superstructure of the vehicle and the drivetrain of the vehicle and travel of the vehicle is resisted. When the one or more braking components of a park brake system are in their released position, the park brake system is in its released operational state, and an individual can operate the vehicle freely. When an individual desires to prevent undesirable inadvertent motion of a vehicle that is parked they can effect a set operational state of the park brake system by operating the park brake system to drive the one or more braking components of the park brake system to their set position and maintain them there. When the park brake system is in its set operational state in such a manner, it prevents the vehicle from inadvertently moving.

The mechanisms of park brake systems that drive the one or more braking components of the park brake system between their set and released positions and maintain them in those positions can have many different constructions. The present invention is particularly related to those park brake systems that have connecting linkages between the one or more braking components of the park brake system and a park brake actuator of the park brake system. Such park brake systems are generally constructed such that, when an individual moves the park brake actuator in an engaging direction, the connecting linkages are caused to move in a disengaging direction and the one or more braking components of the park brake system are caused to move toward their set position by the connecting linkages. The construction of such park brake systems is such that when the park brake actuator is moved in a disengaging direction, which is opposite the engaging direction, the connecting linkages are allowed or caused to move in a disengaging direction opposite their engaging direction. When the connecting linkages move in their disengaging direction the one or more braking components of the park brake system are either allowed to or are caused to move toward their released position by the connecting linkages. Most such park brake systems also generally comprise one or more return springs each of which is attached at one end to the superstructure of the vehicle and at the other end to braking components or connecting linkages of the park brake system. The construction of these park brake systems is such that the return springs bias the connecting linkages toward their disengaging direction which, in turn, bias the park brake actuator toward its disengaging direction. As a result, when an individual moves the park brake actuator of such a system in the engaging direction they must overcome the resistance provided by the return springs. Also, in order to maintain the one or more braking components in their set position, forces must be applied to the connecting linkages and/or the park brake actuator to balance the force applied by the return springs and prevent them from driving the connecting linkages and the park brake actuator in their disengaging directions. Most such park brake systems further include latching mechanisms for balancing the forces applied by the return springs to the connecting linkages when the braking components are in their set position so that the braking components can be maintained in their set position without an individual's attention. When an individual releases these latching mechanisms of the park brake system and subsequently releases the park brake actuator, the return springs drive the connecting linkages and the park brake actuator in their disengaging directions and allow or cause the braking components to travel to their released position. Many such park brake systems also have a return stop which is engaged to the superstructure of the vehicle and which contacts some part of the connecting linkages or the park brake actuator as they travel in their disengaging directions and limits the range of travel of the connecting linkages and the park brake actuator in their disengaging direction. For purposes of this disclosure the portion of the connecting linkages or the park brake actuator which contacts the return stop and limits the travel of the connecting linkages in their disengaging direction will be referred to as the return bumper of the park brake system. The return bumper may be any of a number of different portions of the connecting linkages or the park brake actuator. When an individual releases the latching mechanisms of such a park brake system the connecting linkages and the park brake actuator move in their disengaging directions until the return bumper contacts the return stop and their motion is stopped. Many constructions of such park brake systems are constructed in such a manner and operated in such a manner that, when the latching mechanisms of the park brake system are released, the connecting linkages and the park brake actuator develop considerable velocity as they travel in their disengaging direction. In such a situation the connecting linkages and the park brake actuator often have considerable velocity when the return bumper contacts the return stop and their velocity is dissipated almost instantaneously at that point. When the connecting linkages and the park brake actuator have such high velocity when the return bumper hits the return stop, large impact forces occur within the connecting linkages and/or the park brake actuator and the return stop. These large impact forces can have adverse effects upon the durability of the park brake system. Undesirably loud noises can also be generated when the return bumper impacts the return stop with such considerable magnitude. Many prior art park brake systems were constructed with means for adjusting the magnitude of the force applied to the connecting linkages by the return spring and users often adjusted the systems so that the forces applied to the connecting linkages by the return spring were very low. As a result, the impact forces in the park brake system when the return bumper contacts the return stop were relatively low for park brake systems adjusted such that the forces applied to the connecting linkages by the return spring were relatively low. Unfortunately, in many instances users adjusted the park brake system such that the return spring applied forces to the connecting linkages of a magnitude insufficient to ensure proper operation of the park brake system. For this reason, recent incarnations of park brake systems have been constructed in such a manner that the return spring applies relatively large forces to the connecting linkages and also in such a manner that the magnitude of the forces applied to the connecting linkages by the return spring are not adjustable by a user.

SUMMARY OF INVENTION

As a result, an object of the present invention is to provide a vehicle, a park brake system for the vehicle, and connecting linkages and a park brake actuator for the vehicle that are constructed in such a manner that when the latching mechanisms of the park brake system are released, the return bumper contacts the return stop with reduced velocity and force as compared to prior art park brake systems.

The vehicle of the present invention includes a park brake system that has one or more complimentary pairs of a braking component and a braked component. One of the braking component and the braked component of each complimentary pair of a braking component and a braked component is anchored to a superstructure of the vehicle and the other is anchored to a working component of a drivetrain of the vehicle. Friction material is attached to the braking component and/or the braked component of each complimentary pair of a braking component and a braked component. The park brake system is constructed in such a manner, as is well known, that the braking component may be selectively positioned in either a released position or a set position. When a braking component is positioned in its released position, the braking component is disposed at a distance from its complimentary braked component and the park brake system presents no resistance to movement of the working components of the drivetrain relative to the superstructure of the vehicle. When a braking component is positioned in its set position the friction material attached to the braking component and/or its complimentary braked component is compressed with substantial force between the braking component and its complimentary braked component. Thus, when a braking component is in its set position, relative movement between the braking component and its complimentary braked component is resisted by considerable frictional forces between the braking component and the braked component and, thus, relative movement between the superstructure of the vehicle and the working component of the drivetrain to which the braking component and the braked component are engaged is also resisted. The park brake system thus has two operational states—set and released. When the braking component of the park brake system is in its set position, the park brake system is in its set operational state and inadvertent movement of the vehicle is prevented. When the braking component of the park brake system is in its released position the park brake system is in its released operational state and, barring other factors which might prevent the vehicle from moving, the vehicle can be driven freely.

The park brake system of the present invention also includes a park brake actuator and connecting linkages that connect the park brake actuator to the braking component of the park brake system. The connecting linkages and the park brake actuator are constructed and engaged to one another and the braking component in such a manner that, when the park brake actuator is moved in an engaging direction the connecting linkages are caused to move in an engaging direction and the connecting linkages, in turn, drive the braking component toward its set position. The connecting linkages and the park brake actuator are further constructed and engaged to one another and the braking component in such a manner that, when the park brake actuator is moved in a disengaging direction, which is opposite its engaging direction, the connecting linkages are caused or allowed to move in their disengaging direction, which is opposite their engaging direction. When the connecting linkages are caused or allowed to move in their disengaging direction, the braking component is caused or allowed to move toward its released position.

The park brake system of the present invention further includes mechanisms to prevent undesirable inadvertent change of the operational state of the park brake system. In order that the park brake system is maintained in its released operational state unless an individual takes action to put the park brake system in its set operational state, the park brake system includes a return spring. The return spring of the park brake system has one end attached directly or indirectly to the superstructure of the vehicle and the other end attached to the connecting linkages of the park brake system in such a manner that the return spring always urges the connecting linkages and, thus, the park brake actuator in their disengaging direction. For purposes of this disclosure, a first component that is engaged, attached, or anchored indirectly to a second component is engaged, attached, or anchored to the second component through intermediate components. The construction of the park brake system with such a return spring ensures that the park brake actuator and the connecting linkages will not inadvertently move in their engaging direction and cause the park brake to assume its set operational state. As a result of this construction it is necessary for an individual manipulating the park brake actuator in its engaging direction to overcome the forces applied to the connecting linkages by the return spring. In order that the park brake system may be maintained in its set operational state without the attention of an individual, the park brake system includes one or more latching mechanisms. The latching mechanisms can be engaged between the superstructure of the vehicle and either the connecting linkages or the park brake actuator to balance the force in the return spring and, thus prevent the return spring from driving the connecting linkages and the park brake actuator in their disengaging direction. The latching mechanisms can also be released when an individual desires to put the park brake system in its released operational state. The park brake system further includes a return stop to limit the travel of the park brake actuator and the connecting linkages in their disengaging direction. The return stop is structure that is anchored directly or indirectly to the superstructure of the vehicle. The return stop is positioned such that at some point in the travel of the park brake actuator and the connecting linkages in their disengaging direction some part of the park brake actuator or the connecting linkages comes into abutment with the return stop and further travel of the connecting linkages and the park brake actuator in their disengaging direction is prevented. The part of the connecting linkages or the park brake actuator of the system that contacts the return stop and, thus, limits the travel of the connecting linkages and the park brake actuator being, as was mentioned above, the return bumper of the park brake system.

The park brake system of the present invention includes an impact reduction energy absorber for reducing the magnitude of the impact in the park brake system when the return bumper contacts the return stop. A first end of the impact reduction energy absorber is attached to either the park brake actuator or a component of the connecting linkages and a second end of the park brake actuator is connected to either the superstructure of the vehicle directly or indirectly or a component of the connecting linkages to which the first end of the impact reduction energy absorber is not attached. The impact reduction energy absorber acts to reduce the impact in the park brake system, when the return bumper contacts the return stop, in one of two ways. An impact reduction energy absorber that is connected between the superstructure of the vehicle and either the connecting linkages or the park brake actuator absorbs some of the energy transferred to the connecting linkages by the return spring while the connecting linkages and the park brake actuator are traveling in their disengaging direction toward the return stop. By absorbing some of the energy transferred to the connecting linkages while they are moving in their disengaging direction, the impact reducing energy absorber causes the connecting linkages and the park brake actuator to have diminished velocity when the return bumper contacts the return stop and, thus, the magnitude of the impact in the park brake system when the return bumper and return stop contact one another is diminished. An impact reduction energy absorber that is connected between components of the connecting linkages absorbs some of the energy transferred to the connecting linkages by the return spring in a short time period starting when the return bumper and the return stop contact one another. By absorbing energy when the return bumper and the return stop contact one another, such an impact reducing energy absorber also diminishes the magnitude of the impact in the park brake system when part of the connecting linkages or the park brake actuator contacts the return stop.

DRAWINGS

Other objects and advantages of the invention will become more apparent upon perusal of the detailed description thereof and upon inspection of the drawings in which.

DETAILS OF INVENTION

Figure 1:
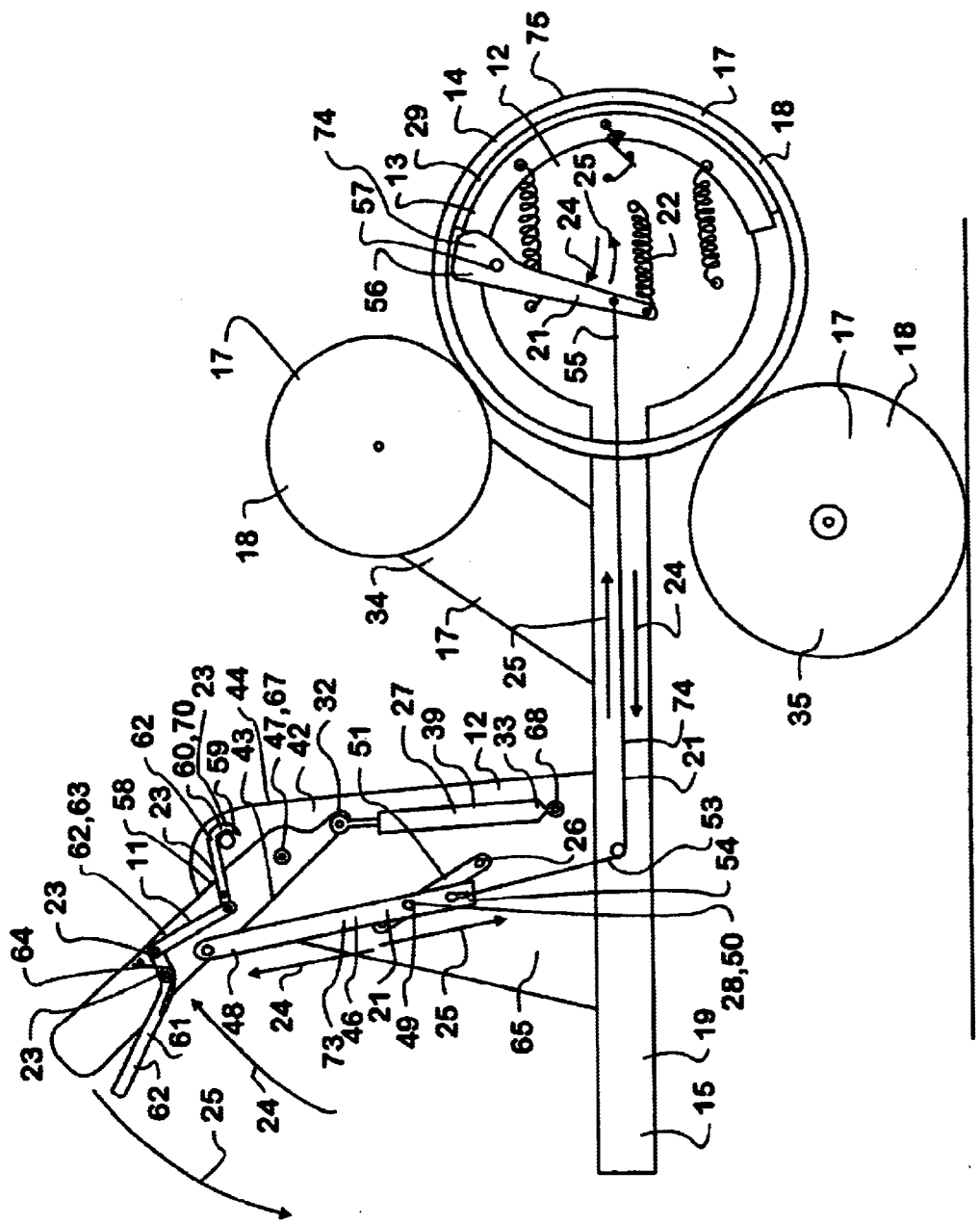
FIG. 1 shows a superstructure and a drivetrain, of a vehicle depicted schematically and to which is engaged an embodiment of the park brake system of the present invention in which the impact-reduction energy absorber is a piston-in-cylinder damper, the park brake system is in its set operational state and the superstructure and which park brake system is in its set operational state.

The present invention is a vehicle 10, and a park brake system 12 for the vehicle 10. In addition to a park brake system 12 the vehicle 10 of the present invention comprises a number of other structures, components, and systems. A vehicle 10 according to the present invention comprises a superstructure 19, which comprises a frame 15 for a vehicle 10 of body-on-frame construction or a main body structure for a vehicle of unibody construction. A vehicle 10 according to the present invention also comprises a suspension system 31 for supporting the superstructure 19 of the vehicle above the ground and for providing the vehicle 10 with a relatively low resistance to movement along the ground. A vehicle 10 according to the present invention further includes one or more body structures 30 upon or within which occupants or cargo of the vehicle 10 may ride. As was alluded to above, a vehicle 10 according to the present invention also comprises a drivetrain 17 for motivating the vehicle 10. The drivetrain 17 of the vehicle 10 comprises one or more ground-engaging driving component(s) 35 such as wheels or tracks and a power source 34 for causing the ground-engaging driving component(s) 35 to move relative to the superstructure 19 of the vehicle 10. When the ground-engaging drive component(s) 35 of the vehicle 10 move relative to the superstructure 19 of the vehicle 10, the vehicle moves relative to the ground. The drivetrain 17 of the vehicle 10 may have one or more intermediate components such as transmissions, driveshafts, and axles, that transfer power and motion from the power source 34 to the ground-engaging drive component(s) 35. For purposes of this disclosure those components of the drivetrain 17 that move relative to the superstructure 19 of the vehicle 10 when the drivetrain 17 motivates the vehicle 10, are considered working components 18 of the drivetrain 17.

The park brake system 12 of the present invention has one or more complimentary pairs of a braking component 13 and a braked component 14. One of the braking component 13 and the braked component 14 of each complimentary pair at a braking component 13 and a braked component 14 is anchored directly or indirectly to a superstructure 19 of the vehicle 10 and the other is anchored to a working component 18 of a drivetrain 17 of the vehicle 10. Friction material 29 is attached to the braking component 13 and/or the braked component 14 of each complimentary pair of a braking component 13 and a braked component 14. As is the case with the park brake systems 12 depicted in the figures, the braking component 13, the braked component 14, and the friction material 29 may be part of a braking assembly 75 of the park brake system 12. The park brake system 12 is constructed in such a manner, as is well known, that the braking component 13 may be selectively positioned in either a released position or a set position. When a braking component 13 is positioned in its released position, the braking component 13 is disposed at a distance from its complimentary braked component 14 and the park brake system 12 presents no resistance to movement of the working components 18 of the drivetrain 17 relative to the superstructure 19 of the vehicle 10. When a braking component 13 is positioned in its set position the friction material 29 attached to the braking component 13 and/or its complimentary braked component 14 is compressed with substantial force between the braking component 13 and its complimentary braked component 14. Thus, when a braking component 13 is in its set position, relative movement between the braking component 13 and its complimentary braked component 14 is resisted by substantial frictional forces between the braking component 13 and the braked component 14 and, thus, relative movement between the superstructure 19 at the vehicle 10 and the working component 10 of the drivetrain 17 to which the braking component 13 and the braked component 14 are anchored is also resisted. The park brake system 12, thus, has two operational states—set and released. When the braking component 13 of the park brake system 12 is in its set position, the park brake system 12 is in its set operational state and inadvertent movement of the vehicle 10 is prevented. When the braking component 13 of the park brake system 12 is in its released position the park brake system 12 is in its released operational state and, barring other factors which might prevent the vehicle 10 from moving, the vehicle 10 can be driven freely. It will, of course, be understood that the construction at the braking component(s) 13 and the braked component(s) 14 of the park brake system 12 and the means for anchoring them to the superstructure 19 and the working components 18 of the drivetrain 17 may be any of a number of well known designs which are in accordance with the above description. A limited number of exemplary designs of these components being described below and/or depicted in the figures.

The park brake system 12 of the present invention also includes a park brake actuator 11 and connecting linkages 21 that connect the park brake actuator 11 to the braking component 13 of the park brake system 12. The connecting linkages 21 and the park brake actuator 11 are constructed and engaged to one another and the braking component 13 in such a manner that, when the park brake actuator 11 is moved in an engaging direction 24 the connecting linkages 21 are caused to move in an engaging direction 24 and the connecting linkages 21, in turn, drive the braking component 13 toward its set position. The connecting linkages 21 and the park brake actuator 11 are further constructed and engaged to one another and the braking component 13 in such a manner that, when the park brake actuator 11 is moved in a disengaging direction 25, which is opposite its engaging direction 24, the connecting linkages 21 are caused or allowed to move in their disengaging direction 25, which is opposite their engaging direction 24. When the connecting linkages 21 are caused or allowed to move in their disengaging direction 25 in such a manner, the braking component 13 is caused or allowed to move toward its released position. The park brake system 12 may be constructed as is alluded to above in such a manner that, when the park brake actuator 11 is moved in its disengaging direction 25 the connecting linkages are allowed to but not necessarily caused to move in their disengaging direction 25 and the braking component 13 is allowed to but not necessarily caused to move to its released position. Such a construction of a park brake system 12 is generally utilized where the braking component 13 of the park brake system 12 is also a braking component 13 of a service brake system, and, thus, it is necessary that the braking component 13 can be urged against its complimentary braked component 14 independent of the park brake system 12. It will, of course, be understood that the construction of the park brake actuator 11, the connecting linkages 21, and their engagement to one another and the rest of the vehicle 10 may be any of a number of well-known designs, which are in accordance with the above description. A limited number of exemplary designs of these components are described below and/or depicted in the figures.

Figure 2:
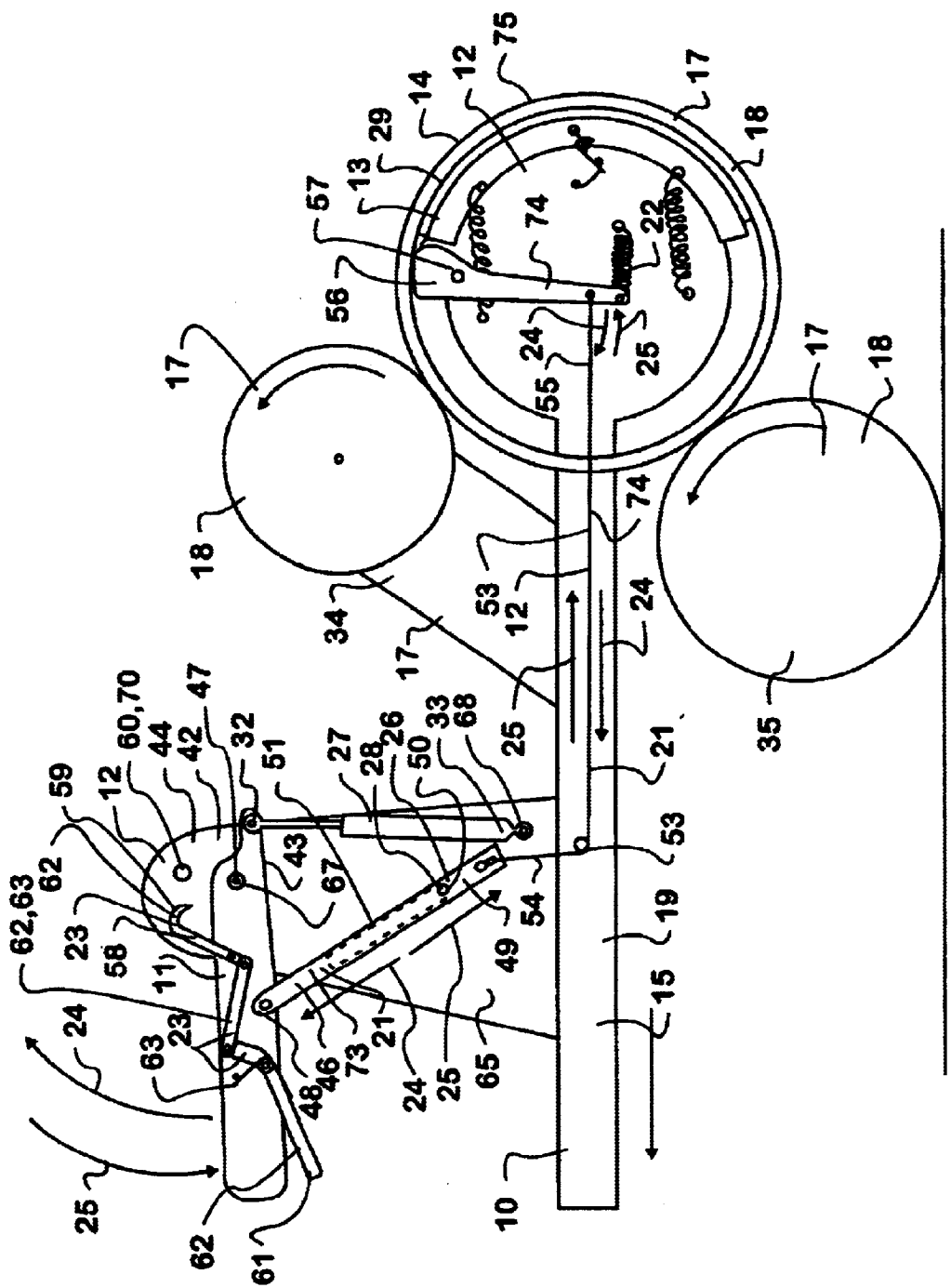
FIG. 2 shows a superstructure and a drivetrain, of a vehicle depicted schematically and to which is engaged an embodiment of the park brake system of the present invention in which the impact-reduction energy absorber is a piston-in-cylinder damper, the park brake system is in its released operational state, the superstructure, and which park brake system is in its released operational state.
Figure 3:
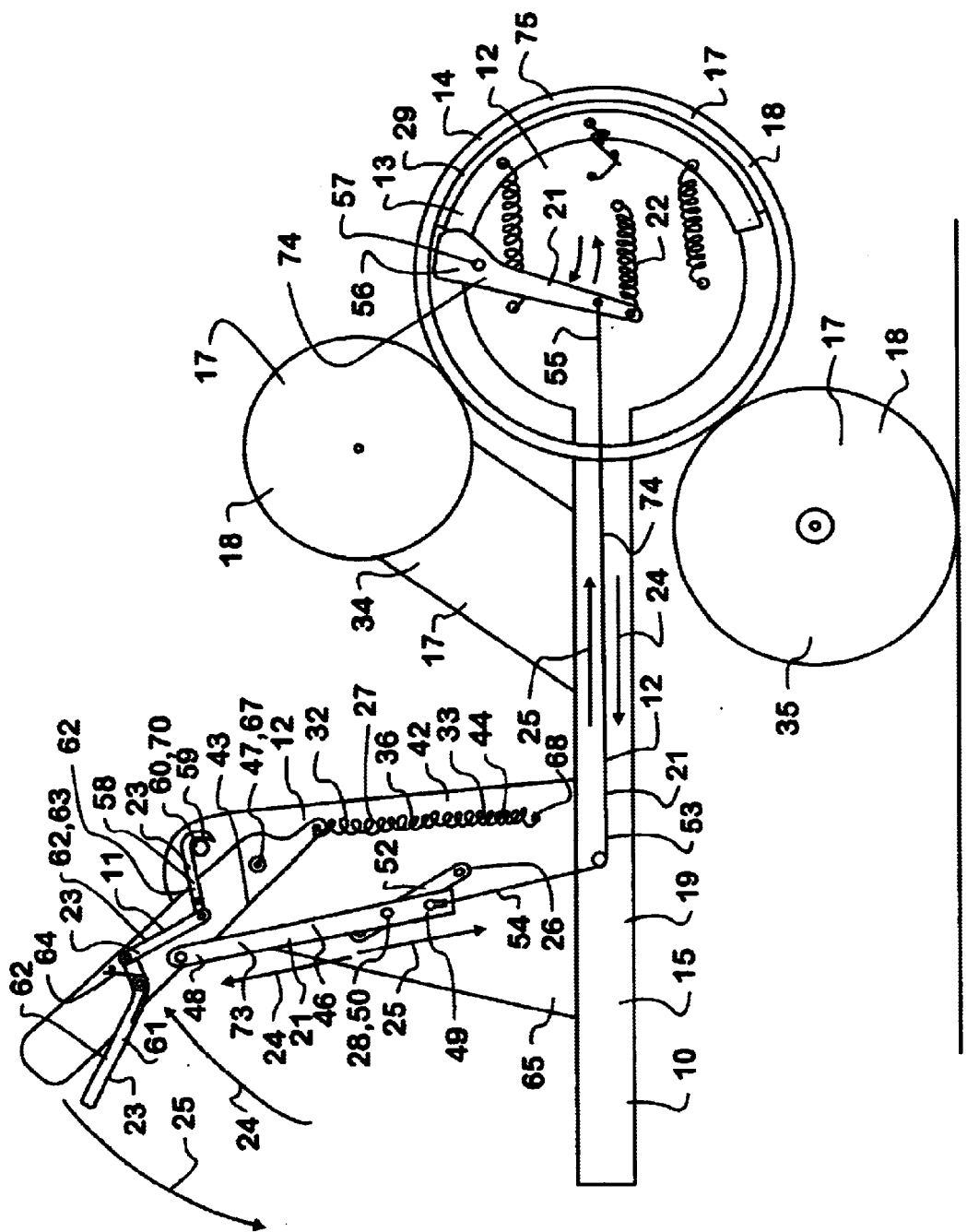
FIG. 3 shows a superstructure and a drivetrain, of a vehicle depicted schematically and to which is engaged an embodiment of the park brake system of the present invention in which the impact-reduction energy absorber is linear-type spring and which park brake system is in its set operational state.
Figure 4:
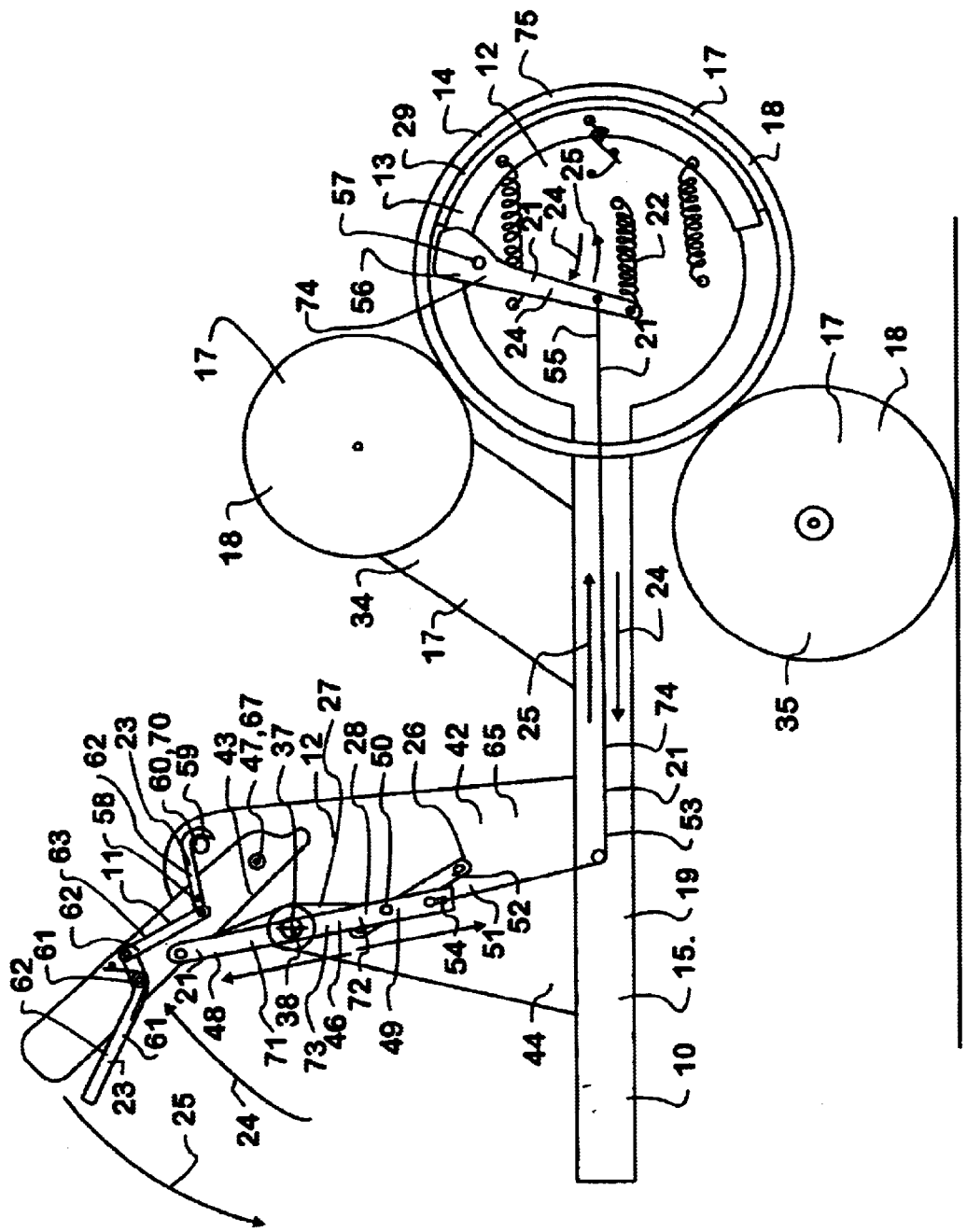
FIG. 4 shows a superstructure and a drivetrain, of a vehicle depicted schematically and to which is engaged an embodiment of the park brake system of the present invention in which the impact-reduction energy absorber is a torsional-type spring and which park brake system is in its set operational state.
Figure 5:
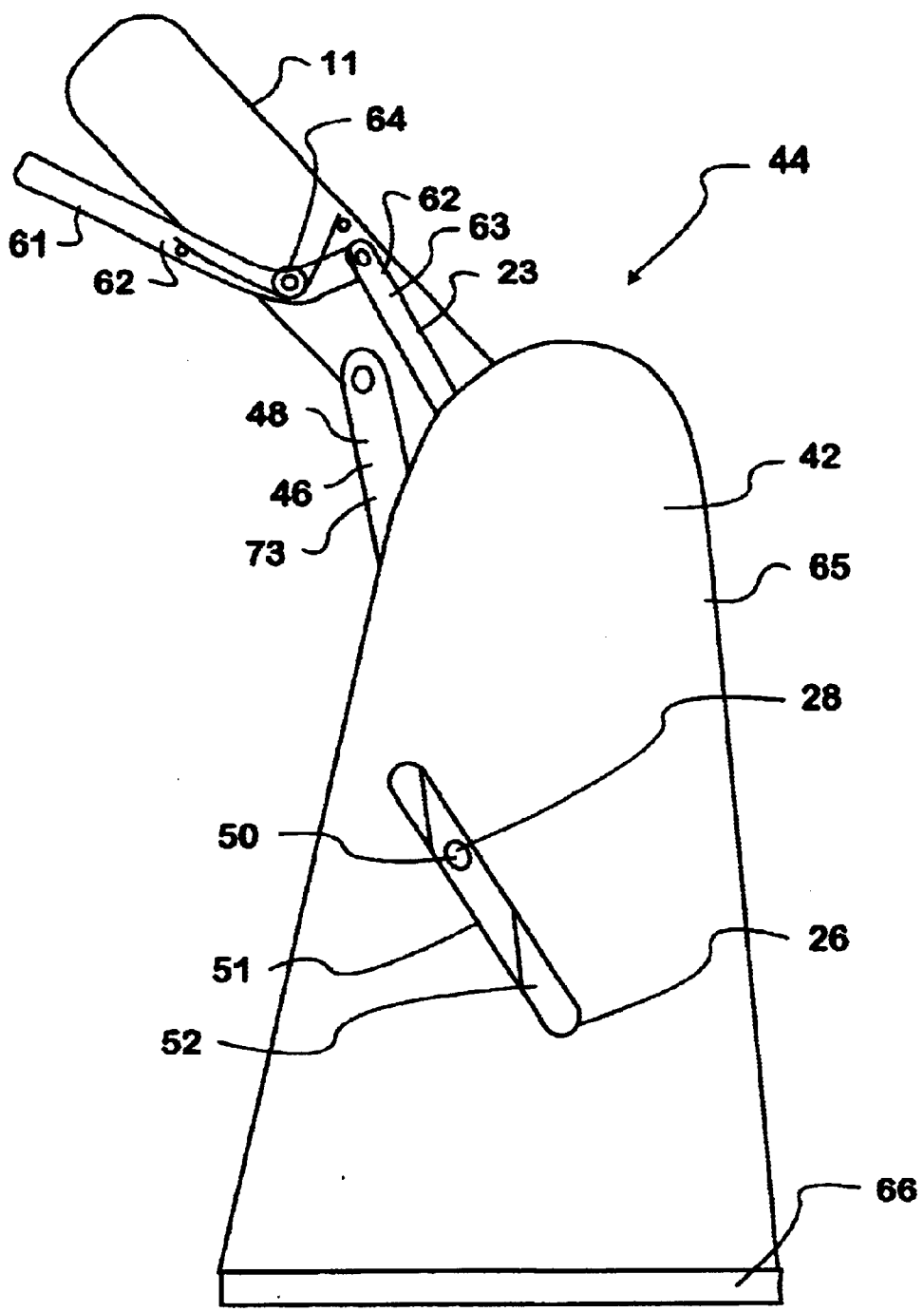
FIG. 5 is a side elevational view of the park brake control module of the preferred embodiment of the present invention.
Figure 6:
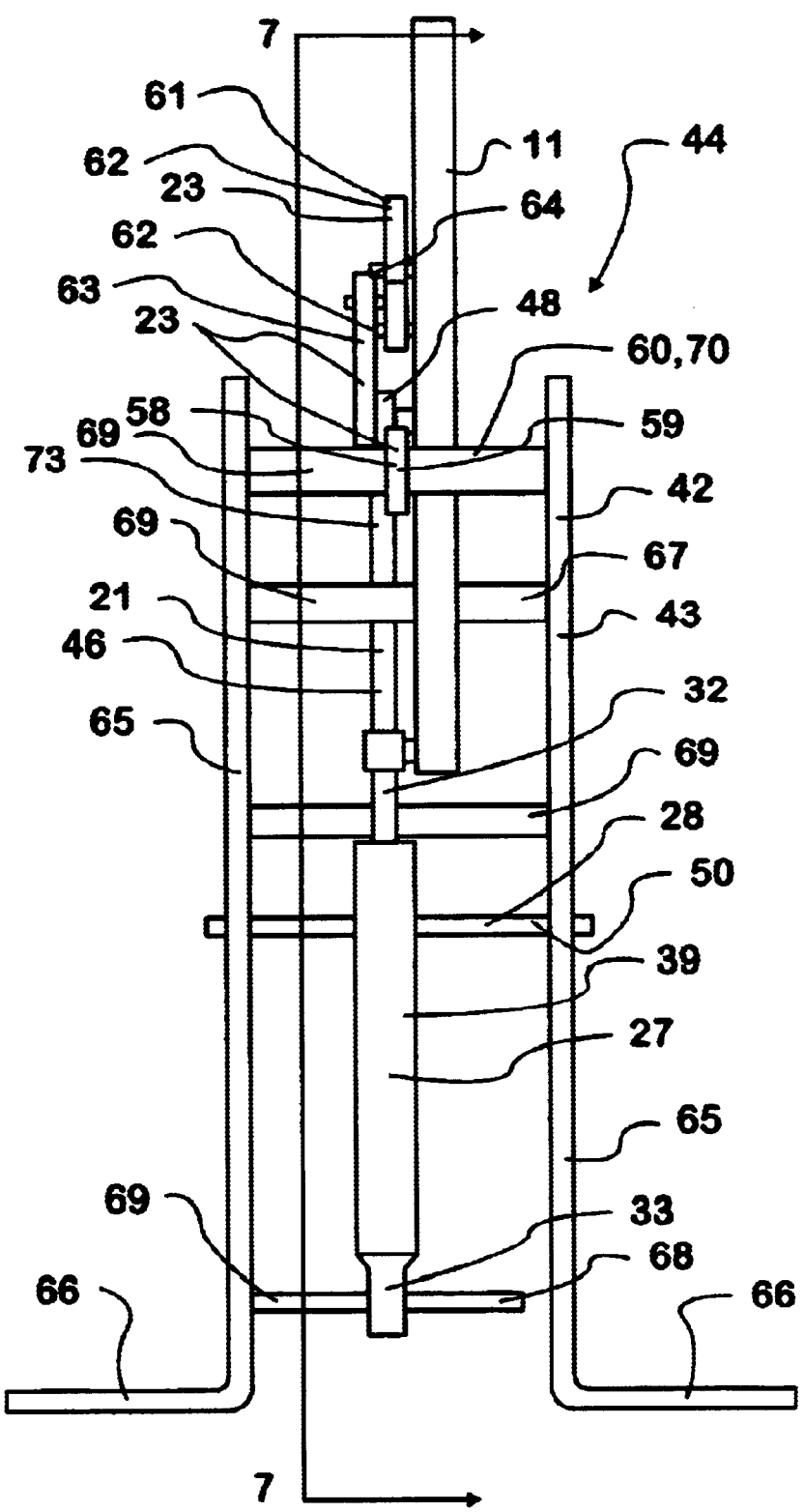
FIG. 6 is a rear elevational view in a direction perpendicular to that of FIG. 5 of park brake control module of the preferred embodiment of the present invention.

The park brake system 12 of the present invention further includes mechanisms to prevent undesirable inadvertent change of the operational state of the park brake system 12. In order that the park brake system 12 is maintained in its released operational state unless an individual takes action to put the park brake system 12 in its set operational state, the park brake system 12 includes a return spring 22. The return spring 22 of the park brake system 12 has one end attached directly or indirectly to the superstructure 19 of the vehicle 10 and the other end attached to the connecting linkages 21 of the park brake system 12 in such a manner that the return spring 22 always urges the connecting linkages 21 and, thus, the park brake actuator 11 in their disengaging direction 25. The construction of the park brake system 12 with such a return spring 22 ensures that the park brake actuator 11 and the connecting linkages 21 will not inadvertently move in their engaging direction 24 and cause the park brake system 12 to assume its set operational state, As a result of this construction, in order for an individual to move the park brake actuator 11 in its engaging direction 24 they must overcome the forces applied to the connecting linkages 21 by the return spring 22. In order that the park brake system 12 may be maintained in its set operational state without the attention of an individual, the park brake system 12 includes one or more latching mechanisms 23. The latching mechanisms 23 can be engaged between the superstructure 19 of the vehicle 10 and either the connecting linkages 21 or the park brake actuator 11 to balance the force applied to the connecting linkages 21 by the return spring 22 and, thus prevent the return spring 22 from driving the connecting linkages 21 and the park brake actuator 11 in their disengaging direction 24. The latching mechanisms 23 can also be unlatched to allow the return spring 22 to drive the connecting linkages 21 and the park brake actuator 11 in their disengaging direction, when an individual desires to put the park brake system 12 in its released operational state. The latching mechanisms 23 of the park brake system 12 and their engagement to the park brake system 12 and other components of the vehicle 10, may be any at a number of constructions well known or easily imaginable to one of ordinary skill in the art. FIGS. 1, 3, and 4 show park brake systems 12 with the latching mechanisms 23 latched and balancing the force applied to the connecting linkages 21 by the return spring 22 and, thus, holding the connecting linkages 21 and the park brake actuator 11 in positions which holds the park brake system 12 in its set operational state. FIG. 2 shows a park brake systems 12 with the latching mechanisms 23 released, thus, allowing the return spring 22 to maintain the connecting linkages 21 and the park brake actuator 11 in positions such that the return bumper 28 is in abutment with the return stop 26 and the park brake system 12 is maintained in its released operational state. The park brake system 12 further includes a return stop 26 to limit the travel of the park brake actuator 11 and the connecting linkages 21 in their disengaging direction 25. The return stop 26 is structure that is anchored directly or indirectly to the superstructure 19 of the vehicle 10. The return stop 26 is positioned such that at some point in the travel of the park brake actuator 11 and the connecting linkages 21 in their disengaging direction 25 some part of the park brake actuator 11 or the connecting linkages 21 comes into abutment with the return stop 26 and further travel of the connecting linkages 21 and the park brake actuator 11 in their disengaging direction 25 is prevented. The part of the connecting linkages 21 or the park brake actuator 11 that contacts the return stop 26 and, thus, limits the travel of the connecting linkages 21 and the park brake actuator 11 being the return bumper 28 of the park brake system 12. It will, of course, be understood that the latching mechanisms 23, the return spring 22, the return stop 26, the return bumper 28, and their engagement to one another and the rest of the vehicle 10 may be any of a number of well known designs which are in accordance with the description. A limited number of exemplary designs of these components being described below and/or depicted In the figures.

Figure 8:
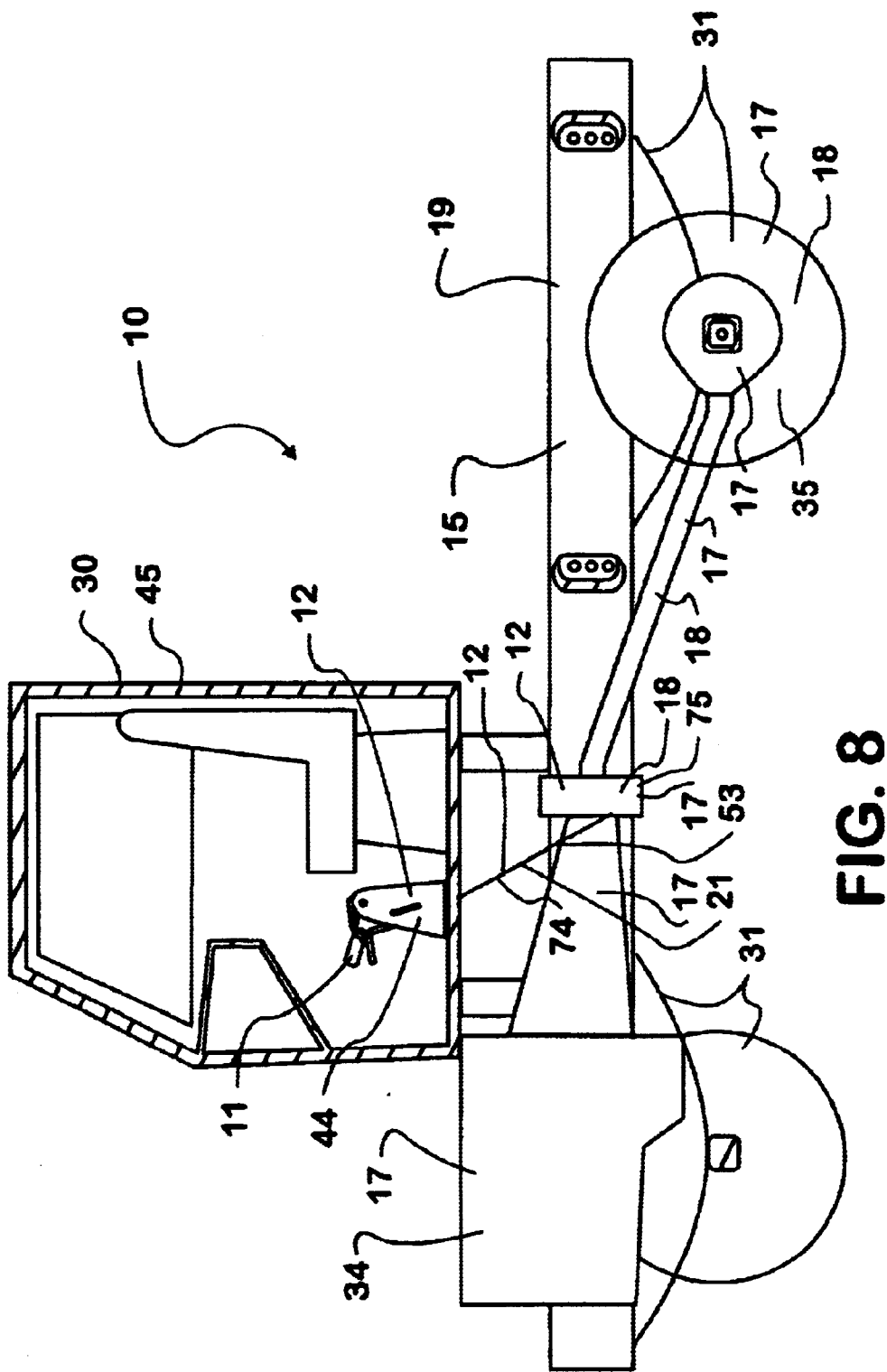
FIG. 8 is a side elevational view of a vehicle with a park brake system according to the present invention and wherein the park brake actuator is positioned and constructed to be manipulated by hand.
Figure 9:
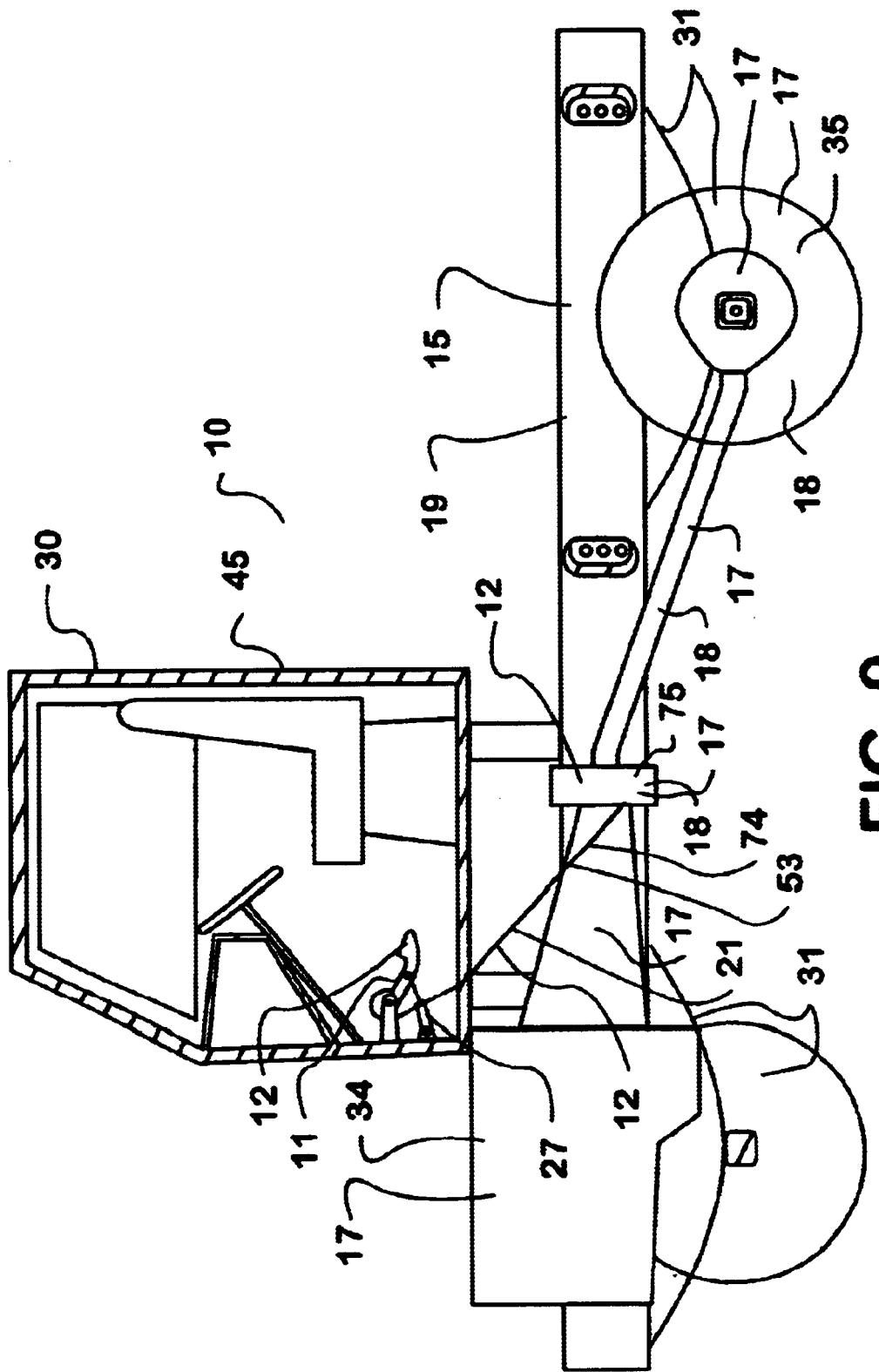
FIG. 9 is a side elevational view of a vehicle with a park brake system according to the present invention and wherein the park brake actuator is positioned and constructed to be manipulated by foot.

The park brake system 12 of the present invention preferably has the park brake actuator 11 mounted to the vehicle 10 in such a position that an operator of the vehicle 10 can readily manipulate it. Many vehicles 10 according to the present invention have an operator cabin 45 that is one of the body structures 30 of the vehicle 10 and from which an individual generally controls operation of the vehicle 10. In the case of such vehicles 10 it is preferred to mount the park brake actuator 11 within the operator cabin 45 adjacent an area which an operator of the vehicle 10 generally occupies while operating the vehicle 10. Placement of the park brake actuator 11 In such a position within an operator cabin 45 of a vehicle 10 is generally well known. A park brake actuator 11 pieced adjacent an area that an operator of the vehicle 10 generally occupies while operating the vehicle 10 may be placed either in a position where it is most easily manipulated by hand or in a position where it is most easily manipulated by foot. FIG. 8 illustrates a park brake system 12 of a vehicle 10 that is constructed in such a manner that the park brake actuator 11 would more easily be actuated by hand. FIG. 9 illustrates a park brake system 12 of a vehicle 10 constructed in such a manner that the park brake actuator 11 would be more easily manipulated by foot. While FIG. 9 depicts the impact-reduction energy absorber 27 as being a linear-acting damper 39, any of a number of types of rotational dampers would, as a result of their compact shape, be very appropriate for use as an impact-reduction energy absorber 27 of a park brake system 12 which has a park brake actuator 11 constructed and positioned to be most easily manipulated by foot. It will be understood that the park brake system 12 of the present invention may have a park brake actuator 11 that is mounted in either a position in which it is most easily manipulated by hand or in a position in which it is most easily manipulated with a foot.

There are certain details of the construction of the connecting linkages 21, the park brake actuator 11, the latching mechanisms 23, the braked component 14, the braking component 13, and their engagement to one another and the vehicle 10 from which a park brake system 12 according to the present invention may deviate, but that are preferred and that are generally depicted in the figures. In the preferred embodiment, the park brake actuator 11 is pivotally mounted to park-brake-actuator support structure 43 at an actuator pivot point 47, which park-brake-actuator support structure 43 is, in turn, anchored directly or indirectly to the superstructure 19 of the vehicle 10. In this preferred embodiment the connecting linkages 21 of the park brake system 12 include a draft link 46 a first end 48 of which is pivotally connected to the park brake actuator 11 at a point at a distance from the actuator pivot point 47. A slide pin 50 is engaged to and extends from a second end 49 of the draft link 46 in one or more directions perpendicular to a longitudinal axis of the draft link 46. Pin-guide structure 51 that is directly or indirectly anchored to the superstructure 19 of the vehicle 10 defines one or more pin-guide slots 52 within which the slide pin 50 is disposed. Thus, when the park brake actuator 11 is pivoted about the actuator pivot point 47, the first end 48 of the draft link 46 is driven by the park brake actuator 11 along an arcuate path, and the second end 49 of the draft link 46 travels in a path defined by the pin-guide slot 52. The connecting linkages 21 of the preferred embodiment, further comprise a park brake cable 53. A first end 54 of the park brake cable 53 is connected to the second end 49 of the draft link 46 and a second end 55 of the park brake cable 53 is connected to a camming arm 56 of the connecting linkages 21. The camming arm 56 is pivotally connected directly or indirectly to the superstructure 19 of the vehicle 10 at a camming arm pivot point 57, which is at a distance from the point of connection of the park brake cable 53 to the camming arm 56. When the park brake actuator 11 is pivoted in its engaging direction 24 the draft link 46 pulls the park brake cable 53 in a direction generally away from the camming arm 56 and causes the camming arm 56 to rotate about the camming arm pivot point 57. The park brake system 12 of the preferred embodiment comprises two braking components 13, each of which is disposed upon an opposite side of the camming arm 56 from the other. The braking components 13 are slideably anchored directly or indirectly to the superstructure 19 of the vehicle 10 and have friction material 29 mounted to them. The park brake system 12 of the preferred embodiment further comprises a braked component 14 that is anchored to a working component 18 of the drivetrain 17, radially surrounds the braking components 13, and rotates around the braking components 13 when the vehicle 10 and thus the working components 18 of the drivetrain 17 are in motion. When the park brake actuator 11 is pivoted in its engaging direction 24, the draft link 46 pulls the park brake cable 53 generally away from the camming arm 56, causing the camming arm 56 to rotate about the camming arm pivot point 57 and causing camming surfaces 58 of the camming arm 56 to wedge the braking components 13 outward toward the braked component 14. The set operational state of the park brake system 12 of the preferred embodiment is effected by pivoting the park brake actuator 11 in its engaging direction to a point at which the camming arm 56 wedges the braking components 13 and the friction material 29 that is attached to them outward against the braked component 14 with considerable force. In the preferred embodiment the return spring 22 has one end connected directly or indirectly to the superstructure 19 of the vehicle 10 and has its other end connected to the camming arm 56 at a point near the point of connection of the park brake cable 53 to the camming arm 56. The return spring 22 is constructed and engaged to these components in such a manner that, the return spring 22 urges the portion of the camming arm 56 to which it is attached in a direction opposite that which the park brake cable 53 pulls the camming arm 56 when the park brake actuator 11 is pivoted in its engaging direction 24. By urging the camming arm 56 in such a direction, the return spring 22 also pulls the park brake cable 53 in its disengaging direction 25. The movement of the camming arm 56, the park brake cable 53, the draft link 46, and the park brake actuators 11 in their disengaging direction 25 is limited by abutment of the slide pin 50 against the portion of the pin-guide structure 51 that defines the end of the pin-guide slot 52 furthest from the park brake actuator 11. Thus, the slide pin 50 acts as the return bumper 28 and the portion of the pin-guide structure 51 that defines the end of the pin-guide slot 52 furthest from the park brake actuator 11 acts as the return stop 26 in the preferred embodiment of the park brake system 12. It will of course, be understood that a slide pin 50 of such a park brake system 12 functioning in such a manner as the return bumper 28 of the park brake system 12 may, in fact, not actually come into direct contact with the pin guide structure 51, because the slide pin 50 may have a roller, bushing, bearing or some other such device disposed around it and that inclusion of such an intermediate device would not negate the slide pin's 50 functionality as the return bumper 28 of the park brake system 12.

Figure 7:
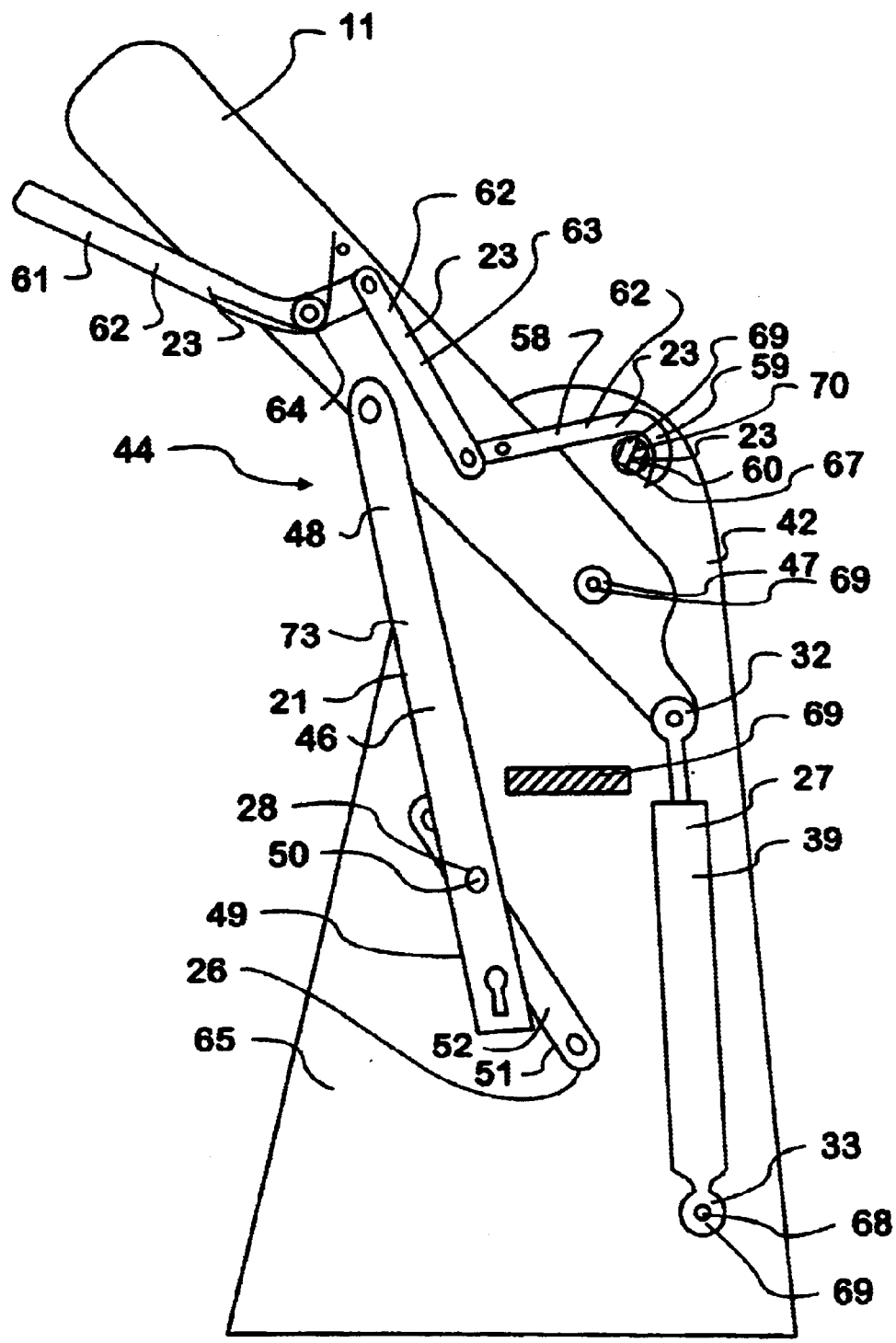
FIG. 7 is a view through line 7—7 of FIG. 6 of the park brake control module of the preferred embodiment of the present invention.

One example of many possible constructions for the latching mechanism(s) 23 of the park brake system 12 is depicted in the figures. As was described above the latching mechanism(s) 23 may be of any construction that can be latched to maintain the connecting linkages 21 and the park brake actuator 11 in such a position that the park brake system 12 is maintained in its set operational state without the attention of an individual and that may also be released to allow the park brake system 12 to assume its released operational state. The latching mechanism 23 of the preferred embodiment is depicted in the figures and is best illustrated in FIG. 7. The latching mechanism 23 of the preferred embodiment includes a latch arm 58 that is pivotally connected to the park brake actuator 11. The latch arm 58 comprises a hook 59 at one end thereof. Latch anchor structure 60 is anchored directly or indirectly to the superstructure 19 of the vehicle 10 and is positioned such that the hook 59 of the latch arm 58 may be hooked around a side of the latch anchor structure 60 opposite the park brake actuator 11 when the park brake actuator 11 is in such a position that the set operational state of the park brake system 12 is effected. A park brake system with the hook 59 hooked around the latch arm 58 in such a manner, and the park brake system 12 maintained in its set operational state as a result is depicted in FIGS. 1, 3, and 4. The released operational state of the park brake system 12 may be effected by disengaging the hook 59 from the latch anchor structure 60 by pivoting the park brake actuator 11 slightly in its engaging direction 24 so that the tip of the hook 59 may clear the latch anchor structure 60, pivoting the latch arm 58 away from the latch anchor structure 60, and letting the return spring drive the connecting linkages 21 and the park brake actuator in their disengaging directions 25. In order to facilitate easy one hand operation of the latch mechanism 23 the park brake system 12 includes latch control mechanisms 62 for controlling the position of the latch arm 58 relative to the park brake actuators 11. The latch control mechanisms 62 include a latch control handle 61 that is pivotally engaged to an outer portion of the park brake actuator 11 and a connecting rod 63 that is pivotally engaged at one end to the latch control handle 61 and pivotally engaged at an opposite end to the latch arm 58. The connecting rod 63 is constructed in such a manner, as can be seen in the figures that, when the latch control handle 61 is pivoted toward the park brake actuator 11 the latch arm 58 pivots in a direction away from the tip of the hook 59 and allows the hook 59 to clear the latch anchor structure 60 as the park brake actuator 11 is pivoted. The latch control mechanisms 62 also include a biasing spring 64 engaged between the park brake actuator 11 and the latch control handle 61 in such a manner to bias the latch control handle 61 away from the park brake actuator 11. As a result of the biasing spring 64 being engaged to the latch control mechanisms 62 in such a manner, an individual must urge the latch control handle 62 toward the park brake actuator 11 in order to cause the latch arm 58 to pivot away from the tip of its hook 59 before the park brake actuator 11 can be pivoted through the portion of its motion in which the hook 59 must pass the latch anchor structure 60. Such a construction prevents the operational state of the park brake system 12 from inadvertently changing from set to released or vice versa.

The park brake system 12 of the present invention includes an impact-reduction energy absorber 27 for reducing the magnitude of the impact in the park brake system 12 when the return bumper 28 contacts the return stop 26. A first end 32 of the impact-reduction energy absorber 27 is attached to either the park brake actuator 11 or a component of the connecting linkages 21 and a second end 33 of the park brake actuator 11 is connected to either the superstructure 19 of the vehicle 10 directly or indirectly or a to component of the connecting linkages 21 to which the first end 32 of the impact reduction energy absorber 27 is not attached. The impact-reduction energy absorber 27 absorbs some of the energy transferred to the connecting linkages 21 of the park brake system 12 by the return spring 22 and, thus, reduces the impact in the park brake system 12 when the return bumper 28 contacts the return stop 26. It will be understood that the first end 32 and the second end 33 of the impact-reduction energy absorber 27 could be physically disposed adjacent to one another, but that they are disposed upon opposite ends of a load transfer path through the impact-reduction energy absorber 27.

As was mentioned above, one manner in which the impact-reduction energy absorber 27 may be engaged to the park brake system 12 and the vehicle 10 is with its first end 32 connected to either a component of the connecting linkages 21 or to the park brake actuator 11 and with its second end 33 connected directly or indirectly to the superstructure 19 of the vehicle 10. Impact-reduction energy absorbers 27 connected in such a manner are shown in FIGS. 1, 2, and 3. An impact-reduction energy absorber 27 connected to the park brake system 12 and the vehicle 10 in such a manner absorbs energy transferred to the connecting linkages 21 by the return spring 22 while the connecting linkages 21 and the park brake actuator 11 travel in their disengaging direction 25. By absorbing some of the energy transferred to the connecting linkages 21 while they are moving in their disengaging direction 25, the impact-reducing energy absorber 27 reduces the velocity that the connecting linkages 21 and the park brake actuator 11 have when the return bumper 28 contacts the return stop 26. Thus, the magnitude of the impact in the park brake system 12 when the return bumper 28 and return stop 26 contact one another is diminished as a result of the park brake system 12 being constructed with an impact-reduction energy absorber 27 engaged to the park brake system 12 and the vehicle 10 in such a manner.

Another way in which the impact-reduction energy absorber 27 may be engaged to the park brake system 12 is with its first end 32 connected to either the park brake actuator 11 or a component of the connecting linkages 21 and with its second end 33 connected to a component of the connecting linkages 21 to which its first end 32 is not connected. An examples of a park brake system 12 configured with an impact-reduction energy absorber 27 engaged to the park brake system 12 in such a manner is depicted in FIG. 4. An impact-reduction energy absorber 27 engaged to a park brake system 12 in such a manner absorbs some of the energy transferred to the connecting linkages 21 by the return spring 22 during a short period of time starting when the return bumper 28 contacts the return stop 26. By absorbing energy when the return bumper 28 and the return stop 28 contact one another, such an impact reducing energy absorber 27 also diminishes the magnitude of the impact in the park brake system 12 when the return bumper 28 and the return stop 26 contact one another.

The impact-reduction energy absorber 27 of the park brake system 12 of the present invention may be either a spring or a damper. In fact, the impact-reduction energy absorber 27 may be some combination of one or more springs of various types and/or one or more dampers of various types. FIGS. 3 and 4 depict park brake systems 12 which include impact-reduction energy absorbers 27 that are springs. An impact-reduction energy absorber 27 that is a spring may be any of a number of different constructions and may be engaged to the park brake system in any of a number of different ways. An impact-reduction energy absorber 27 may be a linear-type spring 36 that is constructed to be compressed and/or extended between its first end 32 and its second end 33. A park brake systems 12 that includes an impact-reduction energy absorbers 27 that is a linear-type spring 36 is shown in FIG. 3. An impact-reduction energy absorber 27 may also be a torsional-type spring 37 that is constructed to be twisted about a twist axis 38 of the torsional type spring 37 between its first end 32 and its second end 33. A park brake system 12 that includes an impact-reduction energy absorber 27 that is a torsional-type spring 37 is shown in FIG. 4. The impact-reduction energy absorber 27, of the park brake system 12, may be a linear-acting damper 39 that is constructed to be compressed and extended linearly between its first end 32 and its second end 33. Such a linear-acting damper 39 resists linear compression and/or extension between its first end 32 and its second end 33 with a force proportional to the rate of compression or extension. Park brake systems 12 that include impact-reduction energy absorbers 27 that are linear-acting dampers 39 are shown in FIGS. 1, 2, 6, 7, and 9. The impact-reduction energy absorber 27 may also be a rotational damper that is constructed so that its first end and its second end can be rotated relative to one another about one or more rotational axes of the rotational damper. Such a rotational damper is also constructed in such a manner that rotation of its first end and its second end relative to one another about one or more of the rotational axes of the rotational damper is resisted in one or both directions with a resistive moment that is proportional to the rate of rotation of the first and second ends relative to one another.

An impact-reduction energy absorber 27 of the park brake system 12 may be a one-way damper or a two-way damper. A two-way damper is a damper that resists movement of its first and second ends 32, 33 relative to one another in both directions in which the construction of the damper allows for movement of the first and second ends 32, 33 relative to one another. As was described above a linear-acting damper 39 is constructed in such a manner that its first and second ends 32, 33 may translate linearly relative to one another. A linear-acting damper 39 that is a two way damper resists both movement of its first and second ends 32, 33 away from one another, which is extension of the linear-acting damper 39 and movement of its first and second ends 32, 33 toward one another, which is compression of the linear-acting damper 39. The forces with which a linear-acting damper 39 resists extension and compression respectively are proportional to the speed of the relative movement between its first and second ends 32, 33. As was described above, rotational dampers are constructed in such a manner that their first and second ends may rotate in two directions relative to one another about at least one rotational axis of the rotational damper. A rotational damper that is a two-way damper resists, in both directions, relative rotation of its first and second ends, about the rotational axis relative to one another with torques that are proportional to the relative rotational speed of the first and second ends of the rotational damper. A one-way damper is a damper that resists relative movement between its first and second ends 32, 33 in only one of two possible directions in which its first and second ends 32, 33 can move relative to one another. A linear-acting damper 39 that is a one-way damper may be either a compression damper or an extension damper. A compression damper resists compression with a force that is proportional to the rate of compression of the damper and presents negligible resistance to extension. An extension damper resists extension with a force that is proportional to the rate of extension of the damper and presents negligible resistance to compression. Similarly a rotational damper that is a one way damper presents resistance to rotation of its first and second ends relative to one another in one direction and presents negligible resistance to rotation of its first and second ends relative to one another in an opposite direction.

As compared to prior art park brake systems, the park brake system 12 of the present invention may be constructed in such a manner that its impact-reduction energy absorber 27 presents little or no increase in the effort required by an individual to effect the park brake system's 12 set operational state, yet the impact-reduction energy absorber 27 provides for diminished impacts in the park brake system 12 when its released operational state is effected. This embodiment of the park brake system 12 of the present invention includes an impact-reduction energy absorber 27 that is a one-way damper. One of the first end 32 and the second end 33 of the one-way damper is connected to either the connecting linkages 21 or the park brake actuator 11 and the other of the first end 32 and the second end 33 is connected directly or indirectly to the superstructure 19 of the vehicle 10. The one-way damper is connected between the park brake system 12 and the superstructure 19 of the vehicle 10 in such a manner that, when the connecting linkages 21 and the park brake actuator 11 move in their disengaging direction 25, the first and second ends 32, 33 of the one-way damper are driven in the relative direction in which the one-way damper resists relative motion between the first and second ends 32, 33. By way of example, the park brake system 12 shown in FIGS. 1 and 2 includes an impact-reduction energy absorber 27 that is a linear-acting damper 39 with its first end 32 connected to the park brake actuator 11 and its second end 33 connected indirectly to the superstructure 19 of the vehicle 10. The park brake actuator 11 in these figures is pivotally engaged to park brake actuator support structure 43 and is connected to the connecting linkages 21 and the linear-acting damper 39 in such a manner that, when the park brake actuator 11 is rotated in its engaging direction 24 the linear-acting damper 39 is compressed. Likewise, when the park brake actuator 11 shown in FIGS. 1, 2, 5, 6, and 7 is rotated in its disengaging direction 25, the linear-acting damper 39 shown in these figures is extended. If the linear-acting damper 39 shown in these figures is an extension damper it would, as is described above, present little or no resistance to movement of the park brake actuator 11 and, thus, the connecting linkages 21 in their engaging direction 24 while damping movement of the park brake actuator 11 and the connecting linkages 21 in their disengaging direction 25. Such a construction of the park brake system 12 allows an individual to effect the set operational state of the park brake system 12 with little or no additional effort as compared to prior art park brake systems while ensuring minimal impact in the park brake system 12 when the return bumper 28 contacts the return stop 26. It will, of course, be understood that there are a number of ways, easily imagined by one of ordinary skill in the art, and within the scope of the present invention, in which a one-way damper of any of the kinds described above could be connected between either the park brake actuator 11 or the connecting linkages 21 and the superstructure 19 of the vehicle 10 that would provide damping of movement of the park brake actuator 11 and the connecting linkages 21 in their disengaging direction 25 only.

In the preferred embodiment the impact-reduction energy absorber 27 is a piston-in-cylinder type linear-acting damper. FIGS. 1, 2, 5, 6, 7, and 9 depict park brake systems 12 that utilize a piston-in-cylinder type linear-acting damper as the impact-reduction energy absorber 27 of the park brake system 12. Such piston-in-cylinder linear-acting dampers, many different constructions of which are well known, have a cylinder to which one end of the damper is connected and a piston slideably disposed within the cylinder end connected to the other end of the damper. The piston of the damper slides within the cylinder as the ends of the piston-in-cylinder damper move relative to one another. The cylinder of the piston-in-cylinder damper contains working fluid that must flow through relatively restrictive orifices in order for the piston to travel in one or both directions within the cylinder. The piston-in-cylinder damper damps extension and/or compression dependent upon which directions of motion of the piston within the cylinder force the working fluid within the cylinder to flow through the relatively restrictive orifices of the piston-in-cylinder damper. It will be understood that, barring space constraints to the contrary, a piston-in-cylinder damper with each of its ends 32, 33 connected to one of two given points will produce the same system behavior regardless of which of the two given points the first end 32 and the second end 33 are connected to. In other words, a piston-in-cylinder damper may be connected between the two given points in either of two possible orientations 180 degrees from one another and produce the same system performance.

The piston-in-cylinder damper that is the impact-reduction energy absorber 27 of the preferred embodiment is also preferably a hydraulic damper as opposed to a pneumatic damper. A hydraulic damper is a damper that utilizes an incompressible liquid as its working fluid. A pneumatic damper is a damper that utilizes a compressible gas as its working fluid. Because of the much higher viscosity of incompressible liquids as compared to compressible gases, all other factors being equal, a hydraulic damper will provide much greater resistive force than a comparably sized pneumatic damper. Of course, in addition to piston-in-cylinder dampers there are other types of linear-acting dampers 39 and rotational dampers that operate on the principal of forcing working fluid through relatively restrictive orifices as the ends of the damper are moved relative to one another. Because of their relatively compact nature for a given resistance level, dampers of any of these types utilized as impact-reduction energy absorbers 27 in the park brake system 12 of the present invention are preferably hydraulic rather than pneumatic dampers.

As was mentioned above, the impact-reduction energy absorber 27 may have its first end 32 connected to either the park brake actuator 11 or a component of the connecting linkages 21 and its second end 33 connected to a connecting linkage 21 that the first end 32 is not connected to. In one such embodiment of the park brake system 12 of the present invention the impact-reduction energy absorber 27 is a torsional-type spring 37 the first end 32 of which is connected to one component of the connecting linkages 21 and the second end 33 of which is connected to another component of the connecting linkages 21. Such an embodiment of a park brake system 12 according to the present invention is shown in FIG. 4. In this embodiment the draft link 46 of the connecting linkages 21 comprises a first draft member 71 and a second draft member 72 pivotally connected to one another. In this embodiment an end of the first draft member 71 opposite its point of pivotal connection to the second draft member 72 constitutes the first end 48 of the draft link 46 and is pivotally connected to the park brake actuator 11. An end of the second draft member 72 opposite its point of pivotal connection to the first draft member 71 constitutes the second end 49 of the draft link 46 and is located by the slide pin 50 that protrudes from it through the pin guide slot(s) 52 of the park brake system 12. In this embodiment the torsional-type spring 37 that is the impact-reduction energy absorber 27 has each of its first and second ends 32 and 33 engaged to one of the first draft member 71 and the second draft member 72 in such a manner to urge the first and second draft members 71 and 72 into a position such that they are aligned with one another. When the connecting linkages 21 and the park brake actuator 11 travel in their disengaging direction 25 and the slide pin 50, which functions as the return bumper 28, contacts the portion of the pin guide structure 51 that functions as the return stop 26, kinetic energy in the park brake actuator 11 must be rapidly dissipated by forces applied to it by the first end of the draft link 46. When the return bumper 28 of the embodiment of the park brake system 12 shown in FIG. 4 contacts the return stop 26, the first and second ends 48, 49 of the draft link 46 travel toward one another as the first and second draft members 71, 72 pivot to increasing angles relative to one another and the body of the torsional-type spring 37 is twists. When this occurs the torsional-type spring 37 absorbs much of the kinetic energy of the park brake actuator 11 and the draft link 46 and the impact forces in the draft link 46 and the park brake actuator 11 are significantly reduced.

In order to facilitate more efficient assembly of the park brake system 12 of the present invention to a vehicle 10 the park brake system 12 may comprise a park brake control module 44. Such a park brake control module 44 would include a control module frame 42. Such a park brake control module 44 also includes the park brake actuator 11 mounted to the control module frame 42 in such a manner that motions other than those in the engaging and disengaging directions 24, 25 of the park brake actuator 11 are constrained by the engagement of the park brake actuator 11 to the control module frame 42. The park brake control module 44 may also include one or more components of the connecting linkages 21 mounted to the control module frame 42 in a manner such that the motion of the these components of the connecting linkages 21 is constrained to movement in their engaging and disengaging directions 24, 25 by their engagement to the control module frame 42. For purposes of distinction, any connecting linkages 21 of the park brake system 12 that are part of the park brake control module 44 may be considered control module connecting linkages 73 and any other connecting linkages 21 of the park brake system may be considered primary connecting linkages 74. The park brake control module 44 may also include the impact-reduction energy absorber 27. In the case that the park brake control module 44 includes the impact-reduction energy absorber 27 the first end 32 of the impact-reduction energy absorber 27 would be connected to either the park brake actuator 11 or a component of the connecting linkages 21 that is mounted to the control module frame 42. Additionally, in the case that the park brake control module 44 includes the impact-reduction energy absorber 27, the second end 33 of the impact-reduction energy absorber 27 would be connected to the control module frame 42. The park brake control module 44 may, thus, be assembled as described above, and then mounted to the vehicle 10 by simply affixing the control module frame 42 directly or indirectly to the superstructure 19 of the vehicle 10 and connecting any connecting linkages 21 that are not included in the park brake control module 44 to either the park brake actuator 11 or those connecting linkages 21 that are part of the park brake control module 44. Such an assembly process is much easier and more efficient than assembling a park brake actuator 11, support structure for the park brake actuator 11, connecting linkages 21 and the impact-reduction energy absorber 27 to the vehicle 10 one at a time.

While there are many different suitable constructions of a park brake control module 44 that are within the above-outlined guidelines and thus within the scope of the present invention the construction of the preferred embodiment of the park brake control module 44 is described hereinafter for exemplary purposes. In the preferred embodiment the control module frame 42 of the park brake control module 44 comprises two parallel disposed frame plates 65 from each of which a base leg 66 extends perpendicular to the frame plates 65. The park brake actuator support structure 43 of the control module frame 42 of the preferred embodiment comprises an actuator pivot pin 67 that extends between the frame plates 65 of the control module frame 44. The park brake actuator 11 is pivotally mounted to the actuator pivot pin 67. The frame plates 65 also comprise the pin guide structure 51 of the park brake system 12 that was described in more general terms above. The pin guide structure 51 of each of the frame plates 65 surrounds a pin guide slot 52 at a point at a distance from the actuator pivot pin 67. As is described above, the connecting linkages 21 of the park brake system 12, of the preferred embodiment, comprise a draft link 46 a first end 48 of which is pivotally connected to the park brake actuator 11 at a point at a distance from the actuator pivot pin 67. In the preferred embodiment the draft link 46 is part of the park brake control module 44 and the second end 49 of the draft link 46 is situated between the frame plates 65 with the slide pin 50 extending through the second end 49 of the draft link 46 and through both pin guide slots 52 defined by the pin guide structure 51 of the frame plates 65. In the preferred embodiment the park brake control module 44 includes the impact-reduction energy absorber 27. In the preferred embodiment the impact-reduction energy absorber 27 has its first end 32 pivotally connected to the park brake actuator 11 at a point at a distance from the actuator pivot pin 67 of the park brake control module 44 and its second end 33 pivotally connected to an energy absorber anchor pin 68 that extends between the frame plates 65 of the control module frame 42. The park brake control module 44 also preferably includes the latching mechanism 23 described above with the latch arm 58 and the latch control mechanisms 59 mounted to the park brake actuator 11 as described above and the latch anchor structure 60 comprising a latch anchor pin 70 that extends between the frame plates 65 of the control module frame 42. The frame plates 65 of the control module frame 44 are rigidly held in their parallel spaced relationship by one or more crossmembers 69 of the control module frame 42. These crossmembers 69, thus, allow the components of the park brake control module 44 to be assembled together as a unit prior to the mounting of the park brake control module 44 to the vehicle 10. These crossmembers 69 are rigidly engaged to and extend between both of the frame plates 65 of the control module frame 42. The crossmembers 69 may include the actuator pivot pin 67, the energy absorber anchor pin 68, and the latch anchor pin 70. Alternatively, the actuator pivot pin 67, the energy absorber anchor pin 68 and the latch anchor pin 70 of the park brake control module 44 may be engaged to the frame plates 65 of the control module frame 42 in a non-rigid manner and may, therefore, not be capable of providing sufficient support to be considered crossmembers 69. The crossmembers 69 of the control module frame 42 may, therefore comprise, in addition to or instead of the actuator pivot pin 67, the energy absorber anchor pin 68, and the latch anchor pin 70, one or more additional structural members that serve as crossmembers 69 of the control module frame 42.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

What is claimed is:

1. A vehicle, comprising:
   (a) a superstructure which comprises either a frame of said vehicle or a main body structure of said vehicle;
   (b) a suspension system that supports said superstructure above the ground and provides said vehicle with a relatively low resistance to movement along the ground;
   (c) one or more body structures which are either supported by or constitute said superstructure of said vehicle and upon or within which occupants or cargo of said vehicle may ride;
   (d) a drivetrain for motivating said vehicle along said ground;

(e) wherein said drivetrain comprises a ground-engaging drive component and a power source for providing power to and causing said ground-engaging drive component to move relative to said superstructure of said vehicle and thereby causing said vehicle to move relative to said ground;

(f) wherein said drivetrain comprises one or more working components, which include said ground-engaging drivetrain component, that move relative to said superstructure of said vehicle when said drivetrain of said vehicle is motivating said vehicle;

(g) a park brake system for preventing undesirable inadvertent movement of said vehicle;

(h) wherein said park brake system comprises one more complimentary pairs of a braking component and a braked component;

(i) wherein each of said braking components of said park brake system is anchored directly or indirectly to either said superstructure of said vehicle or a working component of said drivetrain;

(j) wherein each said braked component of said park brake system is anchored directly or indirectly to whichever of said superstructure of said vehicle or a working component of said drivetrain a complimentary braking component is not anchored to;

(k) wherein friction material is attached to a braking component and/or braked component of each of said one or more complimentary pairs of a braking component and a braked component;

(l) wherein said park brake system comprises connecting linkages engaged directly or indirectly to said braking component and also engaged to a park brake actuator that is mounted directly or indirectly to said superstructure of said vehicle in such a manner that when said park brake actuator is moved in an engaging direction said connecting linkages move in an engaging direction and drive said braking component toward a position in which said friction material is compressed between said braking component and said braked component;

(m) wherein said park brake system comprises a return spring one end of which is connected directly or indirectly to said connecting linkages and an opposite end of which is connected directly or indirectly to said superstructure of said vehicle in such a manner that said return spring urges said connecting linkages and thus said park brake actuator in a disengaging direction;

(n) wherein said park brake system comprises a return stop which is anchored directly or indirectly to said superstructure of said vehicle and a return bumper which is part of said connecting linkages and said park brake actuator and said return bumper comes into abutment with said return stop at some point as said connecting linkages and said park brake actuator travel in their disengaging direction and thus travel of said connecting linkages and said park brake actuator in their disengaging direction is limited to said point at which said return bumper comes into abutment with said return slop;

(o) wherein said park brake system comprises a latching mechanism that can be latched to balance forces applied to said connecting linkages by said return spring and hold said connecting linkages and said park brake actuator in positions other than those that they occupy when said return bumper and said return stop are in contact with one another;

(p) wherein said latching mechanism can also be released to allow said return spring to drive said connecting linkages and said park brake actuator to positions in which said return bumper and said return stop are in abutment;

(a) wherein said park brake system comprises an impact-reduction energy absorber that is a spring or damper a first end of which is connected either to a component of said connecting linkages or to said park brake actuator and a second end of which is connected either to a component of said connecting linkages to which said first end is not connected or directly or indirectly to said superstructure of said vehicle.

2. The vehicle of claim 1, wherein:

(a) said first end of said impact-reduction energy absorber is connected to either a component of said connecting linkages or to said park brake actuator and said second end of said impact-reduction energy absorber is connected directly or indirectly to said superstructure of said vehicle.

3. The vehicle of claim 2, wherein:

(a) said impact-reduction energy absorber is a damper.

4. The vehicle of claim 3, wherein:

(a) said impact-reduction energy absorber is a one-way damper that resists motion only in one direction; and (b) said one-way damper is connected to said connecting linkages or park brake actuator and said superstructure of said vehicle in such a manner that said one-way damper resists movement of said connecting linkages and said park brake actuator in said disengaging direction and said one-way damper present little or no resistance to movement of said connecting linkages and said park brake actuator in said engaging direction.

5. The vehicle of claim 4, wherein:

(a) said impact-reduction energy absorber is a linear-acting damper.

6. The vehicle of claim 5, wherein:

(a) said impact-reduction energy absorber is a piston-in-cylinder damper.

7. The vehicle of claim 6, wherein:

(a) said park brake system comprises a park-brake-control module;

(b) said park-brake-control module comprises a control-module frame;

(c) said control-module frame is anchored directly or indirectly to said superstructure of said vehicle;

(d) said park brake actuator is mounted to said control-module frame; end (e) a second end of said piston-in-cylinder damper that is said impact-reduction energy absorber of said park brake system is connected to said control-module frame.

8. The vehicle of claim 7, wherein:

(a) said control module frame comprises park brake actuator support structure;

(b) said park brake actuator is pivotally mounted to said park brake actuator support structure at an actuator pivot point of said park brake system; and (c) said piston-in-cylinder damper that is said impact-reduction energy absorber has its first end pivotally connected to said park brake actuator at a point at a distance from said actuator pivot point and its second end pivotally connected to said control module frame at a point at a distance from said actuator pivot point.

9. The vehicle of claim 8, wherein:
(a) said control module frame comprises two frame plates disposed in parallel spaced relationship relative to one another;
(b) a base leg extends perpendicularly from each of said frame plates and each base leg is anchored directly or indirectly to said superstructure of said vehicle;
(c) said park brake actuator support structure comprises an actuator pivot pin that extends between said frame plates and said park brake actuator is pivotally mounted to said actuator pivot pin;
(d) said control module frame comprises an energy absorber anchor pin that extends between said frame plates and to which said second end of said impact-reduction energy absorber is pivotally connected; and
(e) said control module frame comprises one or more crossmembers that are rigidly attached to each of said frame plates and that extend between said frame plates.

10. The vehicle of claim 9, wherein:
(a) said park brake control module comprises a draft link which is part of said connecting linkages of said park brake system;
(b) a first end of said draft link is pivotally connected to said park brake actuator at a distance from said actuator pivot point;
(c) each of said frame plates comprises pin guide structure that surrounds a pin guide slot;
(d) a slide pin extends through a second end of said draft link and also through each of said pin guide slots of defined by said frame plates and, thus, motion of said second end of said draft link is constrained to that allowed by sliding of said slide pin within said pin guide slots;
(e) said slide pin functions as said return bumper of said park brake system and portion(s) of said pin guide structure that define end(s) of said pin guide slots that limit travel of said connecting linkages and said park brake actuator in their disengaging directions, functions as said return stop; and
(f) another component of said connecting linkages is connected to said second end of said draft link.

11. The vehicle of claim 6, wherein:
(a) said park brake actuator is pivotally mounted to park brake actuator support structure at an actuator pivot point;
(b) said park brake actuator support structure is either defined by or directly or indirectly anchored to said superstructure of said vehicle;
(c) said first end of said piston-in-cylinder damper that is said impact-reduction energy absorber is pivotally connected to said park brake actuator at a point at some distance from said actuator pivot point; and
(d) said second end of said piston-in-cylinder damper that is said impact-reduction energy absorber is pivotally connected directly or indirectly to said superstructure of said vehicle.

12. The vehicle of claim 11, wherein:
(a) said piston-in-cylinder damper is a hydraulic damper.

13. The vehicle of claim 6, wherein:
(a) said piston-in-cylinder damper is a hydraulic damper.

14. The vehicle of claim 3, wherein:
(a) said impact-reduction energy absorber is a linear-acting damper.

15. The vehicle of claim 14, wherein:
(a) said impact-reduction energy absorber is a piston-in-cylinder damper.

16. The vehicle of claim 15, wherein:
(a) said park brake system comprises a park-brake-control module;
(b) said park-brake-control module comprises a control-module frame;
(c) said control-module frame is anchored directly or indirectly to said superstructure of said vehicle;
(d) said park brake actuator is mounted to said control-module frame; and
(e) a second end of said piston-in-cylinder damper that is said impact-reduction energy absorber of said park brake system is connected to said control-module frame.

17. The vehicle of claim 16, wherein:
(a) said control module frame comprises park brake actuator support structure;
(b) said park brake actuator is pivotally mounted to said park brake actuator support structure at an actuator pivot point of said park brake system; and
(c) said piston-in-cylinder damper that is said impact-reduction energy absorber has its first end pivotally connected to said park brake actuator at a point at a distance from said actuator pivot point and its second end pivotally connected to said control module frame at a point at a distance from said actuator pivot point.

18. The vehicle of claim 17, wherein:
(a) said control module frame comprises two frame plates disposed in parallel spaced relationship relative to one another;
(b) a base leg extends perpendicularly from each of said frame plates and each base leg is anchored directly or indirectly to said superstructure of said vehicle;
(c) said park brake actuator support structure comprises an actuator pivot pin that extends between said frame plates and said park brake actuator is pivotally mounted to said actuator pivot pin;
(d) said control module frame comprises an energy absorber anchor pin that extends between said frame plates and to which said second end of said impact-reduction energy absorber is pivotally connected; and
(e) said control module frame comprises one or more crossmembers that are rigidly attached to each of said frame plates and that extend between said frame plates.

19. The vehicle of claim 18, wherein:
(a) said park brake control module comprises a draft link which is part of said connecting linkages of said park brake system;
(b) a first end of said draft link is pivotally connected to said park brake actuator at a distance from said actuator pivot point
(c) each of said frame plates comprises pin guide structure that surrounds a pin guide slot;
(d) a slide pin extends through a second end of said draft link and also through each of said pin guide slots of defined by said frame plates and, thus, motion of said second end of said draft link is constrained to that allowed by sliding of said slide pin within said pin guide slots;
(e) said slide pin functions as said return bumper of said park brake system and portion(s) of said pin guide structure that define end(s) of said pin guide slots that limit travel of said connecting linkages and said park brake actuator in their disengaging directions functions as said return stop; andanot (f) her component of said connecting linkages is connected to said second end of said draft link.

20. The vehicle of claim 19, wherein:

(a) said piston-in-cylinder damper is a hydraulic damper.

21. The vehicle of claim 15, wherein:

(a) said park brake actuator is pivotally mounted to park brake actuator support structure at an actuator pivot point;

(b) said park brake actuator support structure is either defined by or directly or indirectly anchored to said superstructure of said vehicle;

(c) said first end of said piston-in-cylinder damper that is said impact-reduction energy absorber is pivotally connected to said park brake actuator at a point at some distance from said actuator pivot point; and (d) said second end of said piston-in-cylinder damper that is said impact-reduction energy absorber is pivotally connected directly or indirectly to said superstructure of said vehicle.

22. The vehicle of claim 15, wherein:

(a) said piston-in-cylinder damper is a hydraulic damper.

23. A park brake control module for mounting to a superstructure of a vehicle and connection to primary connecting linkages of a park brake system of the vehicle, said park brake control module comprising:

(a) a control module frame constructed in such manner to be mounted directly or indirectly to the superstructure of the vehicle;

(b) a park brake actuator mounted to said control module frame and constructed to be connected directly or indirectly to the primary connecting linkages of the park brake system of the vehicle;

(c) wherein said park brake actuator is fully supported by said control module frame and movement of said park brake actuator is constrained to movement in engaging and disengaging directions which movement in said engaging a and disengaging directions of said park brake actuator causes movement of the primary connecting linkages of the park brake system in their engaging and disengaging directions respectively when said park brake control module is properly mounted to the vehicle and connected to the primary connecting linkages of the park brake system;

(d) latching mechanisms that can be latched to maintain said park brake actuator in a position in which the park brake system is maintained in its set operational state when said park brake control module is properly mounted to the vehicle and connected to the primary connecting linkages of the park brake system;

(e) an impact-reduction energy absorber;

(f) wherein a first end of said impact reduction energy absorber is connected to said park brake actuator directly or indirectly and a second end of said impact reduction energy absorber is connected to said control module frame;

(g) wherein said impact-reduction energy absorber is a damper that resists motion with a force or moment that is proportional to the rate of said motion;

(h) said impact-reduction energy absorber is a one-way damper; and (i) said impact-reduction energy absorber is a linear-acting damper.

24. The park brake control module of claim 23, wherein:

(a) said impact-reduction energy absorber is a piston-in-cylinder damper.

25. The park brake control module of claim 24, wherein:

(a) said impact-reduction energy absorber is a hydraulic piston-in-cylinder damper.

26. The park brake control module of claim 25, wherein:

(a) said park brake actuator is pivotally mounted to said control module frame at an actuator pivot point;

(b) said first end of said piston-in-cylinder damper that is said impact reduction energy absorber is pivotally connected to said park brake actuator at a point at a distance from said actuator pivot point; aid (c) said second end of said piston-in-cylinder damper that is said impact reduction energy absorber is pivotally connected to said park brake actuator at a point at a distance from said actuator pivot point.

27. The park brake control module of claim 26, further comprising:

(a) control module connecting linkage which comprises a draft link;

(b) wherein a first end of said draft link is pivotally connected to said park brake actuator at a point at a distance from said actuator pivot point and a second end of said draft link is constructed to be connected to the primary connecting linkages of the park brake system;

(c) said control module frame comprise pin guide structure which defines one or more pin guide slots;

(d) a slide pin protrudes from said second end of said draft link and extends through one or more of said pin guide slots defined by said pin guide structure and, thus, movement of said second end of said draft link is constrained to that which is allowed by sliding of said slide pin within said pin guide slot and movement of said park brake actuator and said draft link in their disengaging directions is limited by eventual abutment between said slide pin which functions as a return bumper and a portion of said pin guide structure which functions as a return stop.

28. The park brake control module of claim 27, wherein:

(a) said control module frame comprises two frame plates in a parallel spaced relationship to one another;

(b) said control module frame comprises one or more crossmembers that are rigidly engaged to each of said two frame plates and that extend between said frame plates thereby holding said two frame plates rigidly in their parallel spaced relationship to one another; and (c) a base leg which is constructed to be anchored to the vehicle extends perpendicularly from each of said frame plates.

* * * * *

UNITED STATES PATENT AND TRADEMARK OFFICE
CERTIFICATE OF CORRECTION

PATENT NO. : 6,705,436 B2
DATED : March 16, 2004
INVENTOR(S) : Michael L. Noll et al.

It is certified that error appears in the above-identified patent and that said Letters Patent is hereby corrected as shown below:

<u>Title page,</u>
Item [75], Inventors, should read:

-- [75] Inventors: Michael L. Noll, Fort Wayne, IN (US); Tom E. Harting, Fort Wayne, IN (US); Gayle D. Goodrich, Fort Wayne, IN (US); Trevor T. Downes, Fort Wayne, IN (US); Brian K. Ballschmidt, Fort Wayne, IN (US); Kevin V. O'Sullivan, Fort Wayne, IN (US); Robert L. Cochran, Fort Wayne, IN (US); Jacob Thomas, Fort Wayne, IN (US) --

Signed and Sealed this

Thirteenth Day of July, 2004

JON W. DUDAS
*Acting Director of the United States Patent and Trademark Office*